(12) United States Patent
Horikoshi

(10) Patent No.: US 8,218,288 B2
(45) Date of Patent: Jul. 10, 2012

(54) BIPOLAR LAYERED TYPE ELECTRIC DOUBLE LAYER CAPACITOR

(75) Inventor: Ron Horikoshi, Shizuoka (JP)

(73) Assignee: Meidensha Corporation, Tokyo (JP)

( * ) Notice: Subject to any disclaimer, the term of this patent is extended or adjusted under 35 U.S.C. 154(b) by 153 days.

(21) Appl. No.: 12/674,519

(22) PCT Filed: Aug. 26, 2008

(86) PCT No.: PCT/JP2008/065142
§ 371 (c)(1),
(2), (4) Date: Feb. 22, 2010

(87) PCT Pub. No.: WO2009/034828
PCT Pub. Date: Mar. 19, 2009

(65) Prior Publication Data
US 2011/0110012 A1    May 12, 2011

(30) Foreign Application Priority Data
Sep. 14, 2007  (JP) ................. 2007-238701

(51) Int. Cl.
*H01G 9/00* (2006.01)
*H01G 4/30* (2006.01)
(52) U.S. Cl. ..................... 361/502; 361/301.4
(58) Field of Classification Search ........... 361/301.4, 361/502
See application file for complete search history.

(56) References Cited

U.S. PATENT DOCUMENTS

| | | | |
|---|---|---|---|
| 3,323,026 A * | 5/1967 | Minami et al. ........... | 361/504 |
| 4,783,723 A | 11/1988 | Watanabe et al. | |
| 6,147,305 A | 11/2000 | Honma et al. | |
| 6,392,868 B2 | 5/2002 | Ohya et al. | |
| 6,426,862 B1 * | 7/2002 | Vasechkin et al. ........ | 361/502 |
| 7,095,605 B2 | 8/2006 | Suenaga et al. | |

(Continued)

FOREIGN PATENT DOCUMENTS

JP   2-065003 A   3/1990

(Continued)

OTHER PUBLICATIONS

U.S. Appl. No. 12/674,515, filed Feb. 22, 2010, Watanabe et al.

(Continued)

*Primary Examiner* — Eric Thomas
*Assistant Examiner* — Dion Ferguson
(74) *Attorney, Agent, or Firm* — Foley & Lardner LLP

(57) ABSTRACT

There is provided a bipolar layered type electric double layer capacitor capable of suppressing upsizing of the capacitor unit and enhancing sealability of adjacent capacitor cells. The present invention relates to a bipolar layered type electric double layer capacitor including a multi-layered type body comprising a plurality of capacitor cells 4 stacked on one another, and one or more polarization substrates 2 each being interposed between the adjacent capacitor cells 4, two current collector metal end plates 6, 6 that are disposed on opposite surfaces of the multi-layered type body, respectively, two end plates 7, 7 between which the multi-layered type body and the two current collector metal end plates 6, 6 are interposed, packing members 5 that seal the capacitor cells 4 and have through-holes, and metal spacers 10 that are each formed with a thread groove on an inner circumferential surface thereof and inserted into the through-holes of the packing members 5, the metal spacers 10 each having opposite end portions into which fastening members 9 are respectively screwed to fasten the end plates 7, 7.

7 Claims, 2 Drawing Sheets

U.S. PATENT DOCUMENTS

| | | | |
|---|---|---|---|
| 7,209,342 B2 | 4/2007 | Matsui et al. | |
| 7,835,136 B2 * | 11/2010 | Feaver et al. | 361/502 |
| 2001/0021097 A1 | 9/2001 | Ohya et al. | |
| 2003/0054239 A1 | 3/2003 | Watanabe et al. | |
| 2004/0224226 A1 | 11/2004 | Endo et al. | |
| 2008/0266752 A1 * | 10/2008 | Thrap et al. | 361/502 |

FOREIGN PATENT DOCUMENTS

| | | |
|---|---|---|
| JP | 4-240708 A | 8/1992 |
| JP | 5-205872 A | 8/1993 |
| JP | 6-069080 A | 3/1994 |
| JP | 11-026953 A | 1/1999 |
| JP | 2002-313677 A | 10/2002 |
| JP | 2003-162989 A | 6/2003 |
| JP | 2003-0217985 A | 7/2003 |
| JP | 2003-217986 A | 7/2003 |
| JP | 2004-040938 A | 2/2004 |
| JP | 2004-319098 A | 11/2004 |
| JP | 2005-183556 A | 7/2005 |
| JP | 2005-277346 A | 10/2005 |
| JP | 2006-024660 A | 1/2006 |
| JP | 2006-294985 A | 10/2006 |
| JP | 2006-303269 A | 11/2006 |
| JP | 2007-109775 A | 4/2007 |
| RU | 2 038 657 C1 | 6/1995 |

OTHER PUBLICATIONS

U.S. Appl. No. 12/674,528, filed Feb. 22, 2010, Mishima.
H. Watanabe et al., US PTO Non-Final Office Action, U.S. Appl. No. 12/674,515, dated Nov. 7, 2011, (11 pgs.).
M. Mishima, US PTO Non-Final Office Action, U.S. Appl. No. 12/674,528, dated Nov. 18, 2011, (16 pgs.).
M. Mishima, US PTO Notice of Allowance, U.S. Appl. No. 12/674,528, dated Apr. 26, 2012, (10 pgs.).

* cited by examiner

US 8,218,288 B2

BIPOLAR LAYERED TYPE ELECTRIC DOUBLE LAYER CAPACITOR

TECHNICAL FIELD

The present invention relates to a bipolar layered type electric double layer capacitor.

BACKGROUND ART

An electric double layer capacitor is characterized in that electric energy is stored by physically adsorbing an anion and a cation present in an electrolyte on a positive polarity surface and a negative polarity surface of a polarizable electrode.

FIG. 2 shows an example of a conventional bipolar layered type electric double layer capacitor. As shown in FIG. 2, the conventional bipolar layered type electric double layer capacitor (hereinafter referred to merely as a capacitor) is a layered type capacitor in which an ion-permeable separator 103, and a polarizable electrode including flat activated carbon electrode plates 100 that are bonded onto opposite surfaces of a polarization substrate 102 are alternately layered.

In the following, there is explained the capacitor in which a cell 104 as a minimum unit is constituted of the separator 103 and the activated carbon electrode plates 100, 100 disposed on opposite surfaces of the separator 103. The capacitor includes a multi-layered type body formed by a plurality of cells 104 which are stacked on one another through the polarization substrate 102. The multi-layered type body is tightened by and between two end plates 107, 107 that serve as lamination-retaining metal plates. Packing members 105 are respectively disposed on opposite surfaces of an outer peripheral portion of the polarization substrate 102. The packing members 105 serve to separate the adjacent cells 104 from each other in a hermetically sealed manner for the purpose of preventing the electrolyte in the capacitor unit from leaking out of the capacitor unit. With the provision of the packing members 105, the polarization substrate 102 is sandwiched at the outer peripheral portion between the packing members 105. The packing members 105 also serve to insulate the adjacent cells 104 from each other.

Upon assembling the capacitor, the cells 104 that have necessary withstand voltage (for instance, about 2.5V per unit cell) are stacked together with the packing members 105. Finally, the stacked cells 104 and packing members 105 are fastened with the two end plates 107, 107 through two current collector electrode plates 106, 106 that serve as current collector metal end plates, respectively. Thus, the adjacent cells 104 are kept separated from each other in the hermetically sealed state. Current collector terminals 108, 108 are connected to the current collector electrode plates 106, 106, respectively.

In order to completely separate the adjacent cells 104 from each other in a hermetically sealed manner, it is necessary to apply a sufficiently large fastening force to the end plates 107, 107. For this purpose, the end plates 107, 107 are formed with screw holes, respectively, and the packing members 105 are formed with through-holes in a position where the through-holes are opposed to the screw holes, respectively. Metal screws 109 are inserted and screwed into the screw holes and the through-holes to fasten the end plates 107, 107 to each other (see Patent Document 1). More specifically, a female-threaded resin spacer (hereinafter referred to merely as a resin spacer) 113 is inserted into the respective through-holes of the packing members 105. The resin spacer 113 is a tubular member or a hollow cylindrical member which is made of a resin. The resin spacer 113 has a female-thread on an inner circumferential surface of opposite end portions thereof. The metal screws 109 are screwed into the opposite end portions of the resin spacer 113 to thereby fasten the end plates 107, 107 disposed on the opposite sides and produce a large pressing force that is applied to the stacked cells 104, the packing members 105 and the current collector electrode plates 106.

In view of the construction of the capacitor, there might occur potential difference between the end plates 107, 107. In the capacitor as shown in FIG. 2, since the end plates 107, 107 are in contact with the current collector electrode plates 106, 106, it is necessary to insulate one of the end plates 107, 107 from the other. For this reason, the resin spacer 113 are used as described. For example, polyphenylene sulfide (PPS) containing filler-like glass fiber may be used as a resin material for the resin spacer 113 from the viewpoint of strength, heat resistance and durability.

In addition, there has been conventionally proposed a capacitor in which a plurality of stacked cells are connected with one another in series. Each of the cells have a first terminal and a second terminal, and the first terminal of one cell is connected with the second terminal of the adjacent cell through a rectangular plate-shaped terminal connecting portion. The first terminal or the second terminal, and the terminal connecting portion are fastened to each other by means of bolts and nuts. The terminals, the terminal connecting portion and an insulating block that is disposed between the adjacent terminals are formed with through-holes, respectively. Hollow cylindrical sleeves made of an insulating material are fitted into the through-holes, and the bolts are inserted into the sleeves (see Patent Document 2).

Patent Literature 1: Japanese Patent Application First Publication No. 2003-217986
Patent Literature 2: Japanese Patent Application First Publication No. 2006-294985

SUMMARY OF THE INVENTION

However, in order to keep the hermetically sealed state of the stacked cells 104 in the conventional capacitor shown in FIG. 2 for a long period of time, it is required to obtain a large fastening force that is to be applied between the end plates 107, 107 and prevent the resin spacers 113 from being deformed.

In a case where the resin spacers 113 made of PPS resin are used, the fastening force of the metal screws 109 is determined depending on the strength of the PPS resin. Therefore, in order to increase the fastening force of the metal screws 109, a diameter of the thread of the resin spacers 113, that is, a cross-sectional area of the resin spacers 113, must be increased. This might lead to increase in size of the entire capacitor unit.

Further, the strength of the resin is deteriorated at temperatures exceeding about 60° C. The strength of the resin at 80° C. is about ⅔ of the strength of the resin at 20° C. Since an operating temperature of the capacitor generally ranges from −20° C. to 70° C., the strength of the resin spacer 113 or the sleeve may be deteriorated due to increase in temperature of the resin spacer 113 or the sleeve, thereby causing risks such as deformation of the resin spacer 113 or the sleeve.

The present invention has been made in view of the above problems in the conventional arts. An object of the present invention is to provide a bipolar layered type electric double layer capacitor capable of suppressing upsizing of the capacitor unit and enhancing sealability between adjacent cells.

To solve the above problems in the conventional arts, in a first aspect of the present invention, there is provided a bipolar layered type electric double layer capacitor comprising:

a multi-layered type body comprising a plurality of capacitor cells stacked on one another, and one or more polarization substrates each being interposed between the adjacent capacitor cells;

two current collector metal end plates that are disposed on opposite surfaces of the multi-layered type body, respectively;

two lamination-retaining metal plates between which the multi-layered type body and the two current collector metal end plates are interposed;

packing members that seal the capacitor cells, the packing members having through-holes, respectively, and tubular members that are each formed with a thread groove on an inner circumferential surface thereof, the tubular members being inserted into the through-holes of the packing members, each of the tubular members having opposite end portions into which fastening members are respectively screwed to fasten the lamination-retaining metal plates, wherein the tubular members are made of a metal.

In a second aspect of the present invention, there is provided the bipolar layered type electric double layer capacitor as defined in the first aspect, further comprising an insulating plate that is interposed between each of the two lamination-retaining metal plates and each of the two current collector metal end plates which are opposed to each other, the insulating plate having a heat resistance in at least a temperature range of −20° C. to 70° C.

In a third aspect of the present invention, there is provided the bipolar layered type electric double layer capacitor as defined in the first or second aspect, further comprising an insulating member that covers an outer surface of the tubular member.

In a fourth aspect of the present invention, there is provided the bipolar layered type electric double layer capacitor as defined in the first or second aspect, wherein the metal of the tubular member is stainless steel.

In a fifth aspect of the present invention, there is provided the bipolar layered type electric double layer capacitor as defined in the first or second aspect, wherein the metal of the tubular member is iron and the tubular member has a surface that is plated with a corrosion-resistant layer.

In a sixth aspect of the present invention, there is provided the bipolar layered type electric double layer capacitor as defined in the first or second aspect, wherein the metal of the tubular member is titanium.

In a seventh aspect of the present invention, there is provided the bipolar layered type electric double layer capacitor as defined in one of the second to fifth aspects, wherein the insulating plate is made of one material selected from a group consisting of bakelite, phenol-based resin, epoxy-based resin, polypropylene and polyethylene terephthalate.

In an eighth aspect of the present invention, there is provided the bipolar layered type electric double layer capacitor as defined in one of the third to seventh aspects, wherein the insulating member is a tube that is made of a resin.

In a ninth aspect of the present invention, there is provided the bipolar layered type electric double layer capacitor as defined in one of the third to seventh aspects, wherein the insulating member is a heat-shrinkable tube.

In a tenth aspect of the present invention, there is provided the bipolar layered type electric double layer capacitor as defined in one of the third to seventh aspects, wherein the insulating member is a coating formed by applying a paint made of a resin pigment to the outer surface of the tubular member and baking the paint applied.

EFFECT OF THE INVENTION

According to the bipolar layered type electric double layer capacitor of the present invention, it is possible to increase a strength of the tubular member without increasing a cross-sectional area of the tubular member as compared to the tubular member serving as the resin spacer of the conventional capacitor. As a result, the capacitor unit can be prevented from upsizing, and the sealability between cells adjacent to each other can be enhanced.

Further, the insulating plate having a heat resistance in at least the temperature range of −20° C. to 70° C. can be disposed between the two current collector metal end plate and the two lamination-retaining metal plate. With the provision of the insulating plate, even when there occurs potential difference between the two lamination-retaining metal plates, the capacitor unit can be prevented from being adversely influenced by the potential difference in an operating temperature range of the capacitor.

Further, with the provision of the insulating member that covers the outer circumferential surface of the tubular member, it is possible to prevent a short circuit that is caused due to contact between the tubular member and the polarization substrate which are made of metal.

DETAILED DESCRIPTION OF THE INVENTION

The preferred embodiments of the present invention are explained in more detail below. The preferred embodiments are intended to apply to bipolar layered type electric double layer capacitors having a tubular member into which a fastening member is inserted or screwed.

First Embodiment

Figure 1:
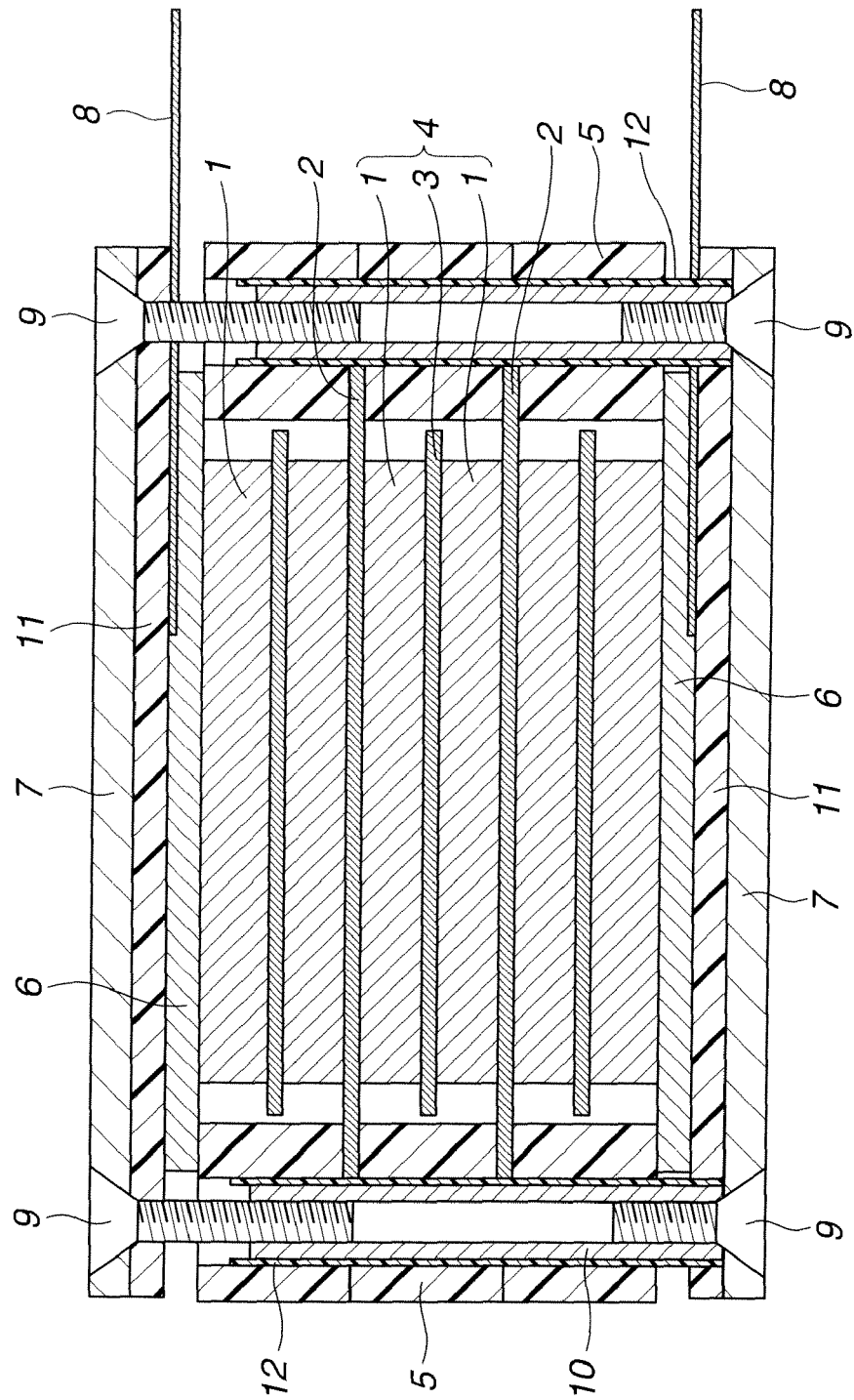
FIG. 1 is a sectional view of a bipolar layered type electric double layer capacitor according to the present invention.
Figure 2:
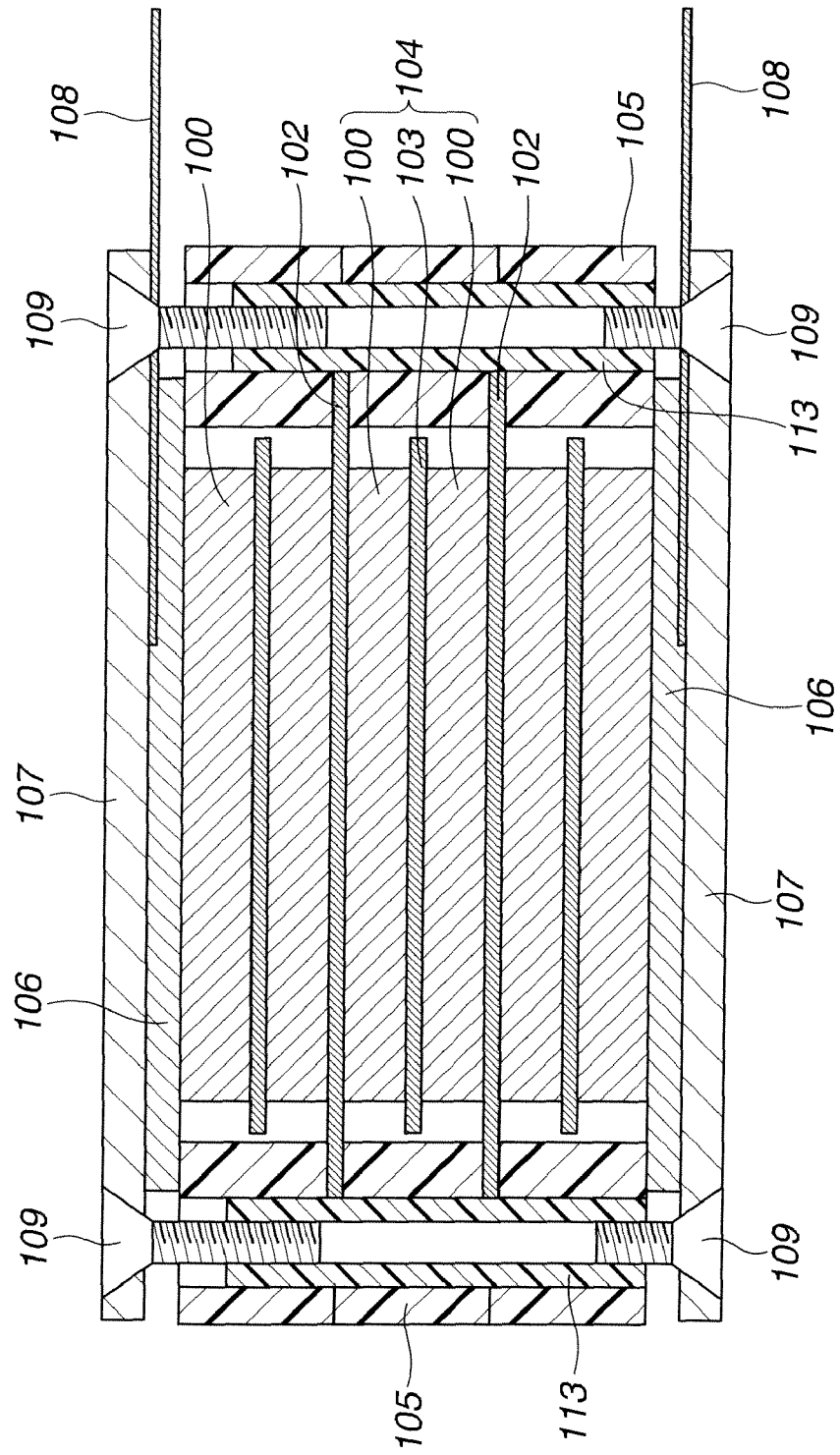
FIG. 2 is a sectional view of a bipolar layered type electric double layer capacitor of a conventional art.

A first embodiment of the present invention will be explained hereinafter with reference to FIG. 1. FIG. 1 is a cross-sectional view showing a construction of a bipolar layered type electric double layer capacitor of the first embodiment.

As shown in FIG. 1, the bipolar layered type electric double layer capacitor (hereinafter referred to as a capacitor) of the first embodiment is a layered type capacitor in which an ion-permeable separator 3 and a polarizable electrode including flat activated carbon electrode plates 1 that are respectively bonded onto opposite surfaces of a polarization substrate 2, are alternately layered type.

The capacitor includes a cell 4 as a minimum unit. The cell 4 includes the separator 3 and the activated carbon electrode plates 1, 1 that are disposed on opposite surfaces of the separator 3. The capacitor has a construction in which a multi-layered type body is fastened by two end plates 7, 7 so as to be interposed between the two end plates 7, 7. The two end plates 7, 7 serve as lamination-retaining metal plates that cooperate to retain the layered type body. The multi-layered type body includes a plurality of the cells 4 which are stacked on one another and one or more polarization substrates 2 each being interposed between the adjacent cells 4. Packing members 5 are disposed on opposite surfaces of an outer peripheral portion of the polarization substrate 2, respectively. The packing members 5 serve to separate the adjacent cells 4 from each other in a hermetically sealed manner in order to prevent the electrolyte in the capacitor unit from leaking out of the capacitor unit. With the provision of the packing members 5, the polarization substrate 2 is interposed between the opposite surfaces of the outer peripheral portion the packing members 5. The packing members 5 also serve to insulate the adjacent cells 4 from each other.

Upon assembling the capacitor, the cells 4 that provide necessary withstand voltage (for instance, about 2.5V per unit cell) are stacked together with the packing members 5. Finally, the cells 4 stacked together with the packing members 5 are fastened by and between the two end plates 7, 7 through two current collector electrode plates 6, 6. The two current collector electrode plates 6, 6 serve as current collector metal end plates, respectively. Thus, the adjacent cells 4 are kept separated from each other in the hermetically sealed state. Current collector terminals 8, 8 are connected to the current collector electrode plates 6, 6, respectively.

In order to completely separate the adjacent cells 4 from each other in a hermetically sealed manner, the end plates 7, 7 are formed with screw holes, respectively, and the packing members 5, 5 are formed with through-holes that are disposed at a position corresponding to the screw holes, respectively. Metal screws 9, 9 each serving as a fastening member are inserted and screwed into the screw holes of the end plates 7, 7 and the aligned through-holes of the stacked packing members 5, 5 to thereby fasten the end plates 7, 7 to each other.

Metal spacer 10 is inserted into each of the through-holes of the packing members 5. The metal spacer 10 is a tubular member or a hollow cylindrical member which is made of a metal and has a female-thread on an inner circumferential surface of both of opposite end portions thereof. The metal screws 9, 9 that extend through the end plates 7, 7, respectively, are screwed into the opposite end portions of the metal spacer 10, respectively. The end plates 7, 7 are thus fastened to each other by screwing the metal screws 9, 9 into the metal spacer 10.

In this embodiment, the spacer 10 is made of a metal, whereby the two end plates 7, 7 are electrically conducted with each other through the metal screws 9, 9 and the metal spacer 10. Therefore, an insulating plate 11 is disposed between the current collector electrode plate 6 and the end plate 7 which are opposed to each other, so that the current collector electrode plate 6 and the end plate 7 are electrically isolated from each other. The insulating plate 11 has a suitable thickness, for instance, a thickness of about 0.05 mm to about 2.0 mm. Each of the current collector terminals 8, 8 is connected to the corresponding current collector electrode plate 6 and disposed in such a position where the current collector terminal 8 is prevented from contacting with the metal screws 9, 9 and the metal spacer 10. Thus, the current collector terminals 8, 8 are kept isolated from each other.

An insulating member 12 is disposed on an outer circumferential surface of the metal spacer 10 to cover the outer circumferential surface of the metal spacer 10. The insulating member 12 serves for preventing the outer circumferential surface of the metal spacer 10 from coming into contact with the polarization substrate 2 made of an aluminum foil for performing the polarization, and serves for inhibiting short-circuit therebetween. Preferably, the insulating member 12 has a length slightly larger than that of the metal spacer 10 by a necessary amount in order to suppress occurrence of short-circuit between the metal spacer 10 and the polarization substrate 2.

As described above, the bipolar layered type electric double layer capacitor of the first embodiment employs the metal spacer 10 having the opposite female-threaded end portions into which the metal screws 9, 9 for fastening the end plates 7, 7 are respectively screwed. With the provision of the metal spacer 10, the strength of the capacitor can be increased about twice to about three times as compared to the strength of the conventional capacitor using a PPS resin spacer. For instance, if the cross-sectional area of the metal spacer 10 of the capacitor of the first embodiment is equal to that of the resin spacer of the conventional capacitor, the strength of the metal spacer 10 according to the first embodiment is increased about twice to about three times as compared to the resin spacer 13 of the conventional capacitor.

With the arrangement of the metal spacer 10, the bipolar layered type electric double layer capacitor of the first embodiment can suppress upsizing of the capacitor unit and enhance sealability between the adjacent cells. Further, since metal has the heat-resisting temperature range of several hundred degrees centigrade (° C.) or more, the bipolar layered type electric double layer capacitor of the first embodiment can be prevented from suffering from deterioration in strength in an ordinary operating temperature range of the capacitor. Therefore, the bipolar layered type electric double layer capacitor of the first embodiment can maintain a good sealability between the adjacent cells for a long period of time as compared to the conventional capacitor.

Further, the insulating plate 11 is disposed between the current collector electrode plate 6 and the end plate 7 which are opposed to each other so as to electrically isolate the current collector electrode plate 6 and the end plate 7 from each other. Accordingly, even when potential difference is generated between the two end plates 7, 7, the capacitor unit that includes the activated carbon electrode plates 1, the polarization substrate 2, the separator 3 and the current collector electrode plates 6 can be prevented from being adversely influenced by the potential difference.

Further, the insulating member 12 is so disposed as to cover the outer circumferential surface of the metal spacer 10. With the provision of the insulating member 12, the outer peripheral edge of the polarization substrate 2 can be prevented from coming into direct contact with the metal spacer 10 and therefore from causing short-circuit therebetween.

Second Embodiment

The second embodiment is substantially the same as the first embodiment explained above with reference to FIG. 1 except that the material of the metal spacer 10 is stainless steel. In particular, in view of cost and strength, SUS303 and SUS304 are preferably used as the stainless steel. Since the other construction of the capacitor of the second embodiment is substantially the same as shown in FIG. 1 and described above, detailed explanations therefore are omitted.

In the second embodiment that employs the metal spacer 10 made of stainless steel, since the strength of stainless steel is as large as about three times the strength of PPS resin, the strength of the capacitor of the second embodiment can be increased without increasing the cross-sectional area, as compared to the conventional capacitor. The second embodiment, therefore, can suppress upsizing of the capacitor unit and enhance sealability between the adjacent cells. Further, since stainless steel has an excellent corrosion resistance, treatments such as surface treatment are not necessary in this embodiment.

Third Embodiment

The third embodiment is substantially the same as the first embodiment explained above with reference to FIG. 1 except that the material of the metal spacer 10 is iron. In the third embodiment, a corrosion-resistant layer is plated on an outer surface of the metal spacer 10 to prevent corrosion of the iron.

Since the other construction of the capacitor of the third embodiment is substantially the same as shown in FIG. 1 and described above, detailed explanations therefore are omitted.

In the third embodiment that employs the metal spacer 10 made of iron, the strength of the metal spacer 10 is substantially the same as that of the metal spacer made of stainless steel of the second embodiment. Accordingly, the third embodiment can suppress upsizing of the capacitor unit and enhance sealability between the adjacent cells. In addition, the material cost can be reduced to about ½ and also the working cost can be reduced.

Fourth Embodiment

The fourth embodiment is substantially the same as the first embodiment explained above with reference to FIG. 1 except that the material of the metal spacer 10 is titanium. Since the other construction of the capacitor of the fourth embodiment is substantially the same as shown in FIG. 1 and described above, detailed explanations therefore are omitted.

In the fourth embodiment that employs the metal spacer 10 made of titanium, surface treatment is not necessary and the strength of titanium is as large as about two times the strength of the PPS resin used as the spacer of the conventional capacitor. Therefore, the fourth embodiment can suppress upsizing of the capacitor unit and enhance sealability between the adjacent cells. Further, the mass of the metal spacer 10 in the fourth embodiment can be reduced to about ½ as compared to the metal spacer made of stainless steel in the second embodiment and the metal spacer made of iron in the third embodiment.

Fifth Embodiment

The fifth embodiment is substantially the same as the first embodiment explained above with reference to FIG. 1 except that the material of the insulating plate 11 is a thermosetting resin, for instance, bakelite, phenol-based resin, epoxy-based resin and the like. Since the other construction of the capacitor of the fifth embodiment is substantially the same as shown in FIG. 1 and described above, detailed explanations therefor are omitted.

In the fifth embodiment that employs the insulating plate 11 made of a thermosetting resin, it is possible to attain a heat-resisting temperature of 300° C. or higher and a high insulating property in addition to the same effects as those of the first embodiment.

Sixth Embodiment

The sixth embodiment is substantially the same as the first embodiment explained above with reference to FIG. 1 except that the material of the insulating plate 11 is a polyolefin-based resin, for instance, polypropylene and the like. Since the other construction of the capacitor of the sixth embodiment is substantially the same as shown in FIG. 1 and described above, detailed explanations therefore are omitted.

In the sixth embodiment that employs the insulating plate 11 made of a polyolefin-based resin, it is possible to exhibit a heat-resisting temperature of about 120° C. in addition to the same effects as those of the first embodiment. Further, as compared to the fifth embodiment, the material cost of the insulating plate 11 can be reduced, and the thickness of the insulating plate 11 can be reduced.

Seventh Embodiment

The seventh embodiment is the same as the first embodiment explained above with reference to FIG. 1 except that the material of the insulating plate 11 is polyethylene terephthalate (PET film). Since the other construction of the capacitor of the seventh embodiment is substantially the same as shown in FIG. 1 and described above, detailed explanations therefore are omitted.

In the seventh embodiment that employs the insulating plate 11 made of polyethylene terephthalate, it is possible to exhibit a heat-resisting temperature of about 200° C. as well as an excellent insulating property and a reduced cost in addition to the same effects as those of the first embodiment. Further, as compared to the fifth and sixth embodiments, the thickness of the insulating plate 11 can be reduced while keeping the excellent insulating property.

Eighth Embodiment

The eighth embodiment is the same as the first embodiment explained above with reference to FIG. 1 except that the insulating member 12 is formed by a tubular member or a pipe-shaped member which is made of an insulating material such as polytetrafluoroethylene (PTFE) resin, polypropylene, silicon and the like. The tubular member or the pipe-shaped member is cut into a necessary length, and fitted onto the metal spacer 10, so that the insulating member 12 covering the outer circumferential surface of the metal spacer 10 is provided. The length of the insulating member 12 is set to a length that is slightly larger than the length of the metal spacer 10 to such an extent as to suppress occurrence of short-circuit between the metal spacer 10 and the polarization substrate 2. Since the other construction of the capacitor of the eighth embodiment is substantially the same as shown in FIG. 1 and described above, detailed explanations therefor are omitted.

In the eighth embodiment employing the insulating member 12 that is formed by the tubular member made of an insulating material, it is possible to achieve facilitated attachment of the insulating member 12 onto the metal spacer 10 in addition to the same effects as those of the first embodiment.

Ninth Embodiment

The ninth embodiment is the same as the first embodiment explained above with reference to FIG. 1 except that the insulating member 12 is a heat-shrinkable tube that is made of vinyl chloride-based resin, fluororesin, a polyolefin-based resin and the like. The heat-shrinkable tube is fitted onto the metal spacer 10 and shrunk at a high temperature to thereby provide the insulating member 12. Since the other construction of the capacitor of the ninth embodiment is substantially the same as shown in FIG. 1 and described above, detailed explanations therefor are omitted.

In the ninth embodiment that employs the insulating member 12 formed by the heat-shrinkable tube, it is possible to attain the effect of preventing the insulating member 12 from being displaced or removed from the metal spacer 10 due to vibration or impact that is applied to the capacitor and thereby more effectively suppressing short-circuit between the metal spacer 10 and the polarization substrate 2 in addition to the same effects as those of the first embodiment.

Tenth Embodiment

The tenth embodiment is the same as the first embodiment explained above with reference to FIG. 1 except that the insulating member 12 is an insulating coating that is formed by applying a paint made of a resin pigment to the metal spacer 10 and then baking the applied paint. Since the other construction of the capacitor of the tenth embodiment is substantially the same as shown in FIG. 1 and described above, detailed explanations therefore are omitted.

In the tenth embodiment employing the insulating member 12 in the form of an insulating coating that is formed by applying a paint made of a resin pigment to the metal spacer 10 and then baking the applied paint, the thickness of the insulating member 12 can be reduced so that the capacitor can be further reduced in weight and production cost as compared to the eighth and ninth embodiments. The tenth embodiment also can attain the same effects as those of the first embodiment.

The invention is not limited to the embodiments described above. Various modifications and variations of the embodiments described above, for instance, a combination of the one or more of the embodiments will be made in light of the above teachings unless departing from the scope of the invention.

INDUSTRIAL APPLICABILITY

The present invention is applicable to a bipolar layered type electric double layer capacitor that includes a tubular member into which a fastening member is inserted or screwed.

What is claimed is:

1. A bipolar layered type electric double layer capacitor comprising:
   a multi-layered type body comprising a plurality of capacitor cells stacked on one another, and one or more polarization substrates each being interposed between the adjacent capacitor cells;
   two current collector metal end plates that are disposed on opposite surfaces of the multi-layered type body, respectively;
   two lamination-retaining metal plates between which the multi-layered type body and the two current collector metal end plates are interposed;
   packing members that seal the capacitor cells, the packing members having through-holes, respectively;
   tubular members that are each formed with a thread groove on an inner circumferential surface thereof, the tubular members being inserted into the through-holes of the packing members, each of the tubular members having opposite end portions into which fastening members are respectively screwed to fasten the lamination-retaining metal plates; and
   an insulating member that covers an outer surface of a tubular member,
   wherein the tubular members are made of a metal and the insulating member is a heat-shrinkable tube.

2. The bipolar layered type electric double layer capacitor as claimed in claim 1, further comprising an insulating plate that is interposed between each of the two lamination-retaining metal plates and each of the two current collector metal end plates which are opposed to each other, the insulating plate providing a heat resistance in at least a temperature range of −20° C. to 70° C.

3. The bipolar layered type electric double layer capacitor as claimed in claim 1, wherein the metal of the tubular members is stainless steel.

4. The bipolar layered type electric double layer capacitor as claimed in claim 1, wherein the metal of the tubular members is iron and the tubular members have a surface that is plated with a corrosion-resistant layer.

5. The bipolar layered type electric double layer capacitor as claimed in claim 1, wherein the metal of the tubular members is titanium.

6. The bipolar layered type electric double layer capacitor as claimed in claim 2, wherein the insulating plate comprises material selected from a group consisting of bakelite, phenol-based resin, epoxy-based resin, polypropylene and polyethylene terephthalate.

7. The bipolar layered type electric double layer capacitor as claimed in claim 1, wherein the insulating member is a tube that is made of a resin.

* * * * *